Feb. 10, 1970     D. E. REZNICK ET AL     3,494,678
VIBRATION-DAMPING BEARING
Filed May 27, 1968     2 Sheets-Sheet 1
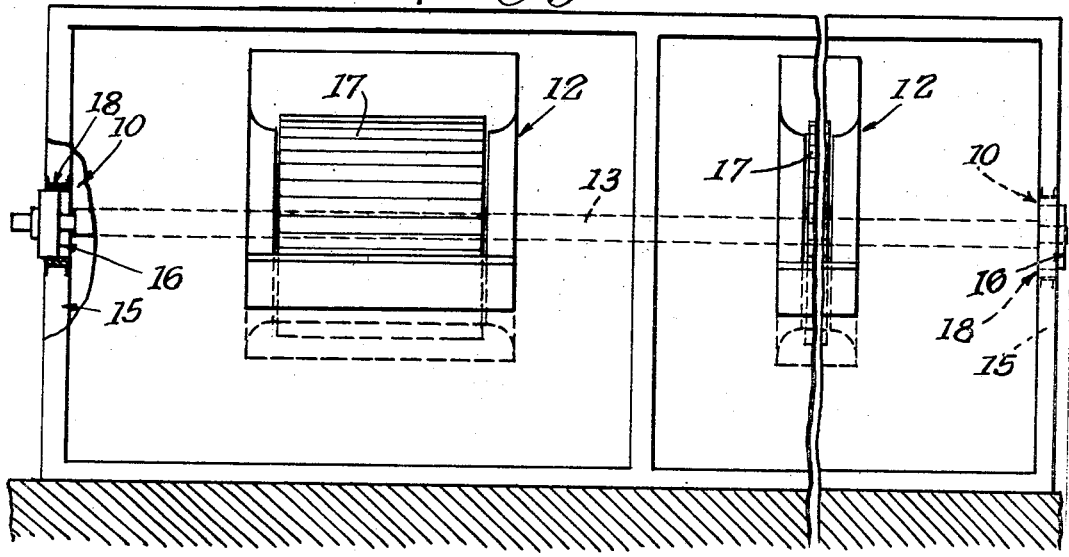
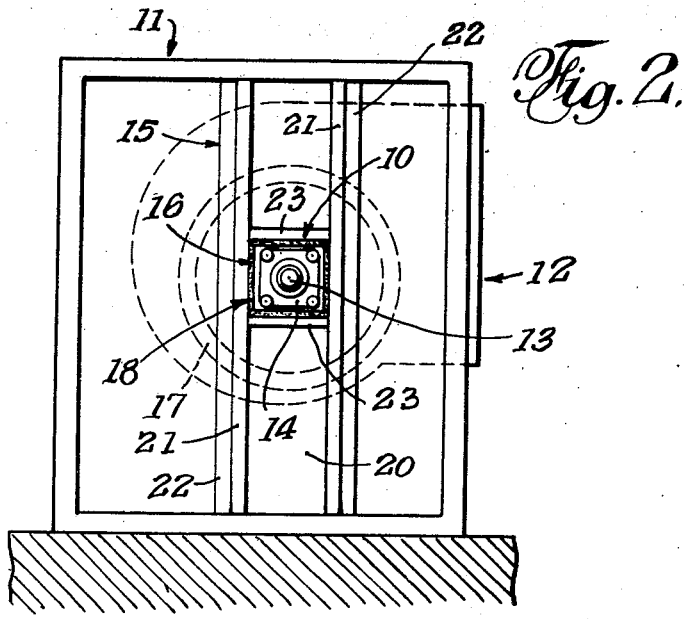
INVENTORS
DAVID E. REZNICK
ERNOE A. FEKETE
BY
*Hyman Hackman*
ATTORNEY

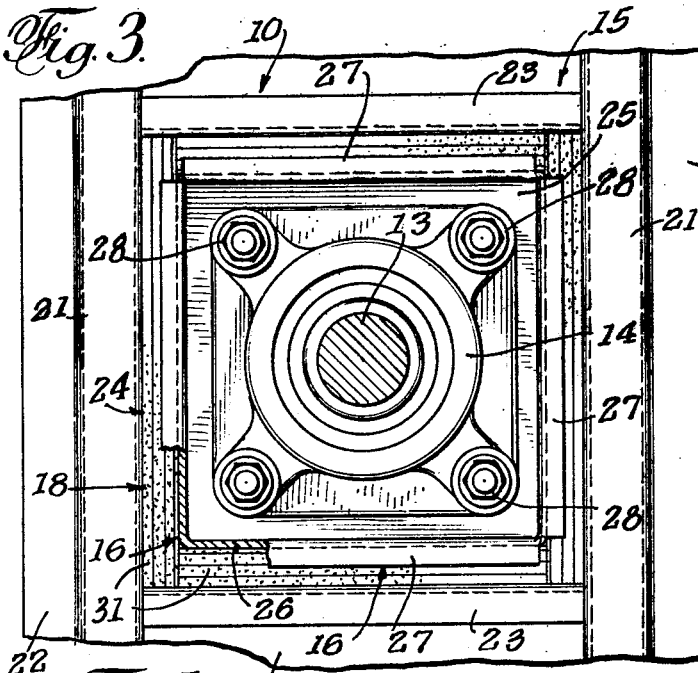
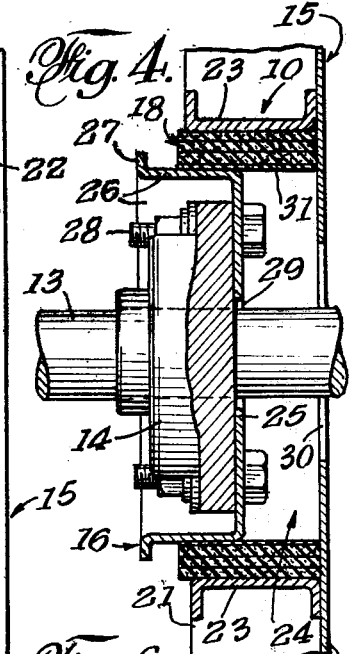
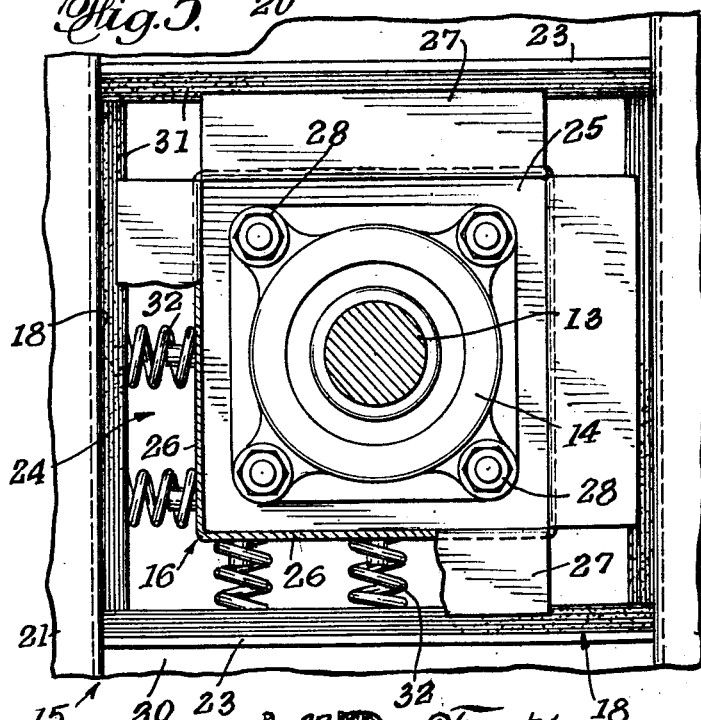
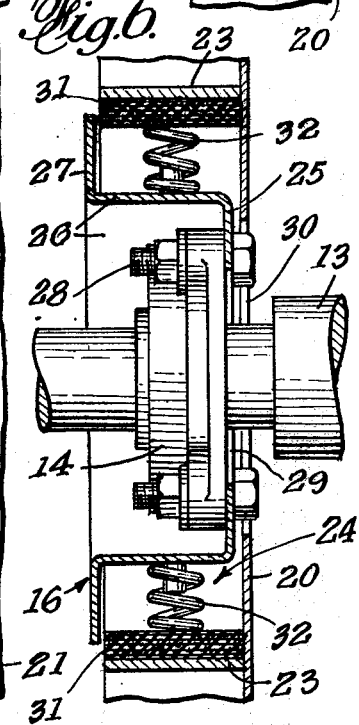
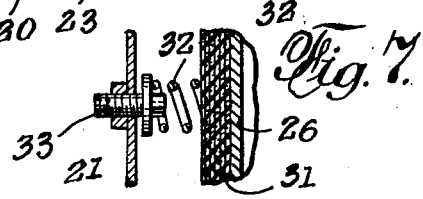
INVENTORS
DAVID E. REZNICK
ERNOE A. FEKETE
BY
Hyman Jackman
ATTORNEY United States Patent Office 3,494,678
Patented Feb. 10, 1970

3,494,678
VIBRATION-DAMPING BEARING
David E. Reznick, 183 S. June St., Los Angeles, Calif. 90004, and Ernoe A. Fekete, 9835 La Docena Lane, Pico-Rivera, Calif. 90660
Filed May 27, 1968, Ser. No. 732,316
Int. Cl. F16c 35/00, 27/00
U.S. Cl. 308—26                                         3 Claims

ABSTRACT OF THE DISCLOSURE

A vibration-damping bearing for a unit provided with a mounting member portion adapted for fixed connection to a support and having metal walls forming a polygonal area with a metal receptacle with marginal walls that conform to and are spaced from the frame parts and disposed in said area, a self-aligning bearing affixed to the receptacle, a rotational shaft journaled in the bearing, resilient means interposed between the corresponding walls of the mounting member and receptacle, the resilient means comprising elastic rubber strips with coil springs interposed between the rubber strips and said marginal walls, and means to regulate the degree of resilience of the springs.

BACKGROUND OF THE INVENTION

Certain structures that generate vibration, not only when running but also when starting up and coming to a stop, require that they be shock or resiliently mounted. This condition prevails particularly in roof-mounted air-conditioning units. Such large units, as well as units of similar size having other purposes and which both vibrate and produce noise, set up frequencies of vibration that are amplified by the support structure. Air-conditioning units of the character above referred to range in weight, for a ten-ton capacity unit, from a weight of one thousand pounds to, for a thirty-ton capacity unit, a weight of about one ton.

Due to the weight of such units and because supports such as roof structures are, for a variety of reasons, quite resilient, they do not efficiently carry out their function of providing a solid support.

Further, the use of shock mounts enables the units, in entirety, to move relative to their supports, with the result that electrical conduits, switches, steam and gas pipes, and the like, installed by electricians, plumbers, refrigeration installers, and others, are subject to vibration. Such installed components may, in time, become faulty, be damaged, and create expensive repair conditions. Also, safety factors may be deleteriously affected.

An object of the present invention is to provide means by which an otherwise vibration- and noise-producing, large unit may be fixedly mounted on a support, said means in a large measure eliminating vibration and sound transmission from high-speed rotational components to the frame and housing of the unit, thereby providing large units of the character above referred to with the advantages and characteristics that such isolation may produce.

This invention also has for its objects to provide such means that are positive in operation, convenient in use, easily installed in a working position and easily disconnected therefrom, economical of manufacture, relatively simp'e, and of general superiority and serviceability.

The invention also comprises novel details of construction and novel combinations and arrangements of parts, which will more fully appear in the course of the following description, which is based on the accompanying drawings. However, said drawings merely show, and the following description merely describes, preferred embodiments of the present invention, which are given by way of illustration or example only.

SUMMARY OF THE INVENTION

The present improved vibration-damping means 10 is shown as provided on an air-conditioning unit 11 having two blowers 12 mounted in spaced relation on a common shaft 13, the opposite ends of said shaft being journaled in self-aligning bearings 14. Said vibration-damping means 10 comprises, generally, a mounting frame or post 15 affixed to each end of the unit 11 and extending in a plane normal to said shaft, a receptacle 16 to which each self-aligning bearing is affixed, and a resilient interconnection 18 between the mounting frame 15 and the receptacle 16 for absorbing vibration and sound generated in the bearing and receptacle by the rotary components 17 of the blower.

BRIEF DESCRIPTION OF THE DRAWINGS

FIG. 1 is a broken front elevational view of an air-conditioning unit provided with vibration-damping bearings for the rotational members thereof, according to the invention.

FIG. 2 is an end view thereof.

FIG. 3 is an enlarged view, as seen in FIG. 2, of one form of bearing.

FIG. 4 is a vertical sectional view thereof.

FIGS. 5 and 6, respectively, are views similar to FIGS. 3 and 4, of another form of bearing.

FIG. 7 is a fragmentary sectional view of another modification.

In the drawings, like reference characters designate similar parts in the several views.

DESCRIPTION OF THE PREFERRED EMBODIMENTS

The unit 11, with its rotational blowers 12, represents a typical unit adapted for incorporation of the present vibration-damping means 10 thereinto. Due to the great length of the shaft 13 which, except at its ends, is tubular, and the high driven speed thereof—ordinarily between 1100 and 1725 r.p.m., a high incidence of vibration and sound attenuation is set up in the shaft 13 and transmitted thereby, through the bearings of the shaft, to the frame of the unit. As a result, said unit frame vibrates, with the undesired effects hereinbefore explained.

Whether the shaft 13 has two bearings, one at each end, or such two and one or more intermediate bearings, the present improved vibration-damping means 10 is provided for each shaft bearing.

The mounting post or frame 15 of each said means 10 is rigidly formed as an integral part of the frame of unit 11. In this case, the member 15 is shown as a sheet metal member having a transverse cross-sectional form, with a mounting web 20, and flanking embossments 21 and flanges 22 on either edge of said web and which render the post light in weight but rigid for the purpose of supporting its portion of the weight of the shaft 13 and the rotary components 17 thereon. A pair of transverse members 23 extend between the embossments 21 and are spaced apart so as to form, with said embossments, a polygonal or rectangular area 24 that is preferably square.

The receptacle 16 is shown as a sheet metal member having an inner web 25, four walls 26 extending from the edges of said web, and stiffening flanges 27 on the edges of said walls 26 that are opposite to the web 25. The light-weight, dished receptacle, except for the flanges 27, is disposed in said area 24 with substantial clearance between it and the area-defining members 21 and 23.

The mentioned self-aligning bearings 14, preferably of the flange-mounted type, are mounted on the webs 25 of the receptacles, as by bolts 28, a clearance hole 29 in each web 25 being provided for the shaft 13. A concentric but preferably larger clearance hole 30 is provided in the web 20 of the post or frame member 15.

The means 18, as shown in FIGS. 3 and 4, comprises a strip of elastic rubber 31 tightly interposed between each wall 26 of the receptacle 16 and the adjacent area-framing members 21 or 23, as the case may be. The strips 31 are preferably formed of plural layers or plies that may vary in thickness and, as required, serve as shims to create rubber-in-shear stresses under vibratory movement of the metal-to-metal engagement of the shaft 13 and the receptacle 16. It will be clear that the vibrations induced in the receptacle are compressible and said unit 11 is not subject to transmission thereof, since the same is eliminated at the source, i.e., at the first point of engagement between the vibrating shaft and the frame of the unit.

It will be understood that the frequency of the vibrating means, when known, can be used for properly isolating the shaft from the unit by shimming accordingly. Since the rotational means, i.e., shaft and fans, are not resiliently isolated from the unit frame, and the mass thereof is substantially smaller than that of the unit 11, the inertia of the latter tends to maintain the same stationary, hence eliminating transmission of the vibrations and noise, as above set forth.

In the form of the invention depicted in FIGS. 5 and 6, the rubber-in-shear means 18 is combined with springs 32. In this case, the strips of rubber 31 are arranged to line the walls of the area 24 and the springs 32 are interposed between said strips and the walls 26 of the receptacle 16. The shim-thickness may be varied, as before, when compensating for vibration variations.

The form shown in FIG. 7 includes means 33 for regulating tension of the springs 32. In this case, the rubber-in-shear strips 31 line the outside of the receptacle walls 16, and the regulating means 33 is applied to the embossments 21.

While the foregoing has illustrated and described what is now contemplated to be the best mode of carrying out the invention, the constructions are, of course, subject to modification without departing from the spirit and scope of the invention.

Having thus described the invention, what is claimed and desired to be secured by Letters Patent is:

1. A vibration-damping bearing comprising:
   (a) a mounting member portion of a unit adapted for fixed connection to a support and provided with metallic walls that frame a polygonal area,
   (b) a metallic receptacle disposed within said area having outer marginal walls and conforming to and spaced from the frame walls, a self-aligning bearing being affixed to said receptacle,
   (c) a rotational member journaled in said bearing, and
   (d) resilient means interposed between the corresponding walls of the mounting member and the receptacle and constituting vibration-damping means, said means being tightly fitted between said corresponding walls,
   (e) the resilient means comprising strips of elastic rubber, and each rubber strip comprising plural rubber plies, at least one of which is thinner than the others,
   (f) the mentioned area being square and the receptacle correspondingly square, and the rubber strips being arranged in square form around the receptacle,
   (g) the resilient rubber strips being arranged within and lining the mentioned metal walls of the mounting member, and
   (h) coil springs being interposed between said rubber lining and the outer marginal walls of the receptacle.

2. A vibration-damping bearing according to claim 1 in which the resilient rubber strips are arranged around the marginal walls of the receptacle and are spaced from the metal parts of the mounting member.

3. A vibration-damping bearing according to claim 2 provided with means to regulate the degree of resilience of said springs.

References Cited

UNITED STATES PATENTS

| | | | |
|---|---|---|---|
| 1,720,191 | 7/1929 | Webb | 308—26 |
| 1,971,417 | 8/1934 | Kingston et al. | 308—26 |
| 2,282,161 | 5/1942 | Brauer | 308—184 X |
| 2,327,035 | 8/1943 | Gray et al. | 308—26 |
| 2,487,343 | 11/1949 | Kopf | 308—184 X |
| 2,652,293 | 9/1953 | Phillips | 308—26 X |
| 2,771,326 | 11/1956 | Smith et al. | 308—184 X |
| 3,243,239 | 3/1966 | Hackman | 308—26 |

FOREIGN PATENTS 906,975  9/1962  Great Britain.

CARROLL B. DORITY, Jr., Primary Examiner

U.S. Cl. X.R.

308—184